United States Patent [19]
Fukuoka

[11] Patent Number: 5,472,080
[45] Date of Patent: Dec. 5, 1995

[54] APPARATUS FOR CONVEYING A LEAD FRAME

[75] Inventor: Yutaka Fukuoka, Yokosuka, Japan

[73] Assignee: Kabushiki Kaisha Toshiba, Kawasaki, Japan

[21] Appl. No.: 213,581

[22] Filed: Mar. 16, 1994

[30] Foreign Application Priority Data

May 24, 1993 [JP] Japan .................. 5-121159

[51] Int. Cl.⁶ .................................................. B65G 15/10
[52] U.S. Cl. .............................. 198/817; 198/785; 193/37
[58] Field of Search ............................ 198/817, 818, 198/824, 785, 820, 821; 193/37

[56] References Cited

U.S. PATENT DOCUMENTS

| 700,308 | 5/1902 | Dodge ........................... 198/846 |
| 4,676,361 | 6/1987 | Heisler ........................ 198/817 X |
| 4,840,268 | 6/1989 | Zemek .......................... 198/817 |
| 4,925,012 | 5/1990 | Guntensperger ............. 198/817 X |

FOREIGN PATENT DOCUMENTS

| 0834556 | 2/1970 | Canada ......................... 198/785 |
| 0834366 | 3/1952 | Germany ..................... 198/820 |
| 1004535 | 3/1957 | Germany ..................... 198/817 |
| 4029669 | 7/1991 | Germany ..................... 198/817 |
| 0031417 | 2/1985 | Japan .......................... 198/785 |
| 60-77006 | 5/1985 | Japan . |
| 0037312 | 2/1986 | Japan .......................... 198/785 |
| 0079919 | 12/1955 | Netherlands ................. 198/821 |

Primary Examiner—James R. Bidwell
Attorney, Agent, or Firm—Finnegan, Henderson, Farabow, Garrett & Dunner

[57] ABSTRACT

First and second shafts are held on first and second guides and a belt is wrapped on the first and second shafts. A motor is mounted on the first guide and rotationally drives a belt. The belt has a surface inclined from its opposite-side edges downward toward its middle to define a recess at the middle of the belt along a conveying direction of the belt. The lead frame is so conveyed that only its opposite-side edges as viewed along the conveying direction of the lead frame are contacted with the surface of the belt and that a bed and leads placed at the middle portion of the lead frame are not contacted with the surface of the belt.

8 Claims, 9 Drawing Sheets

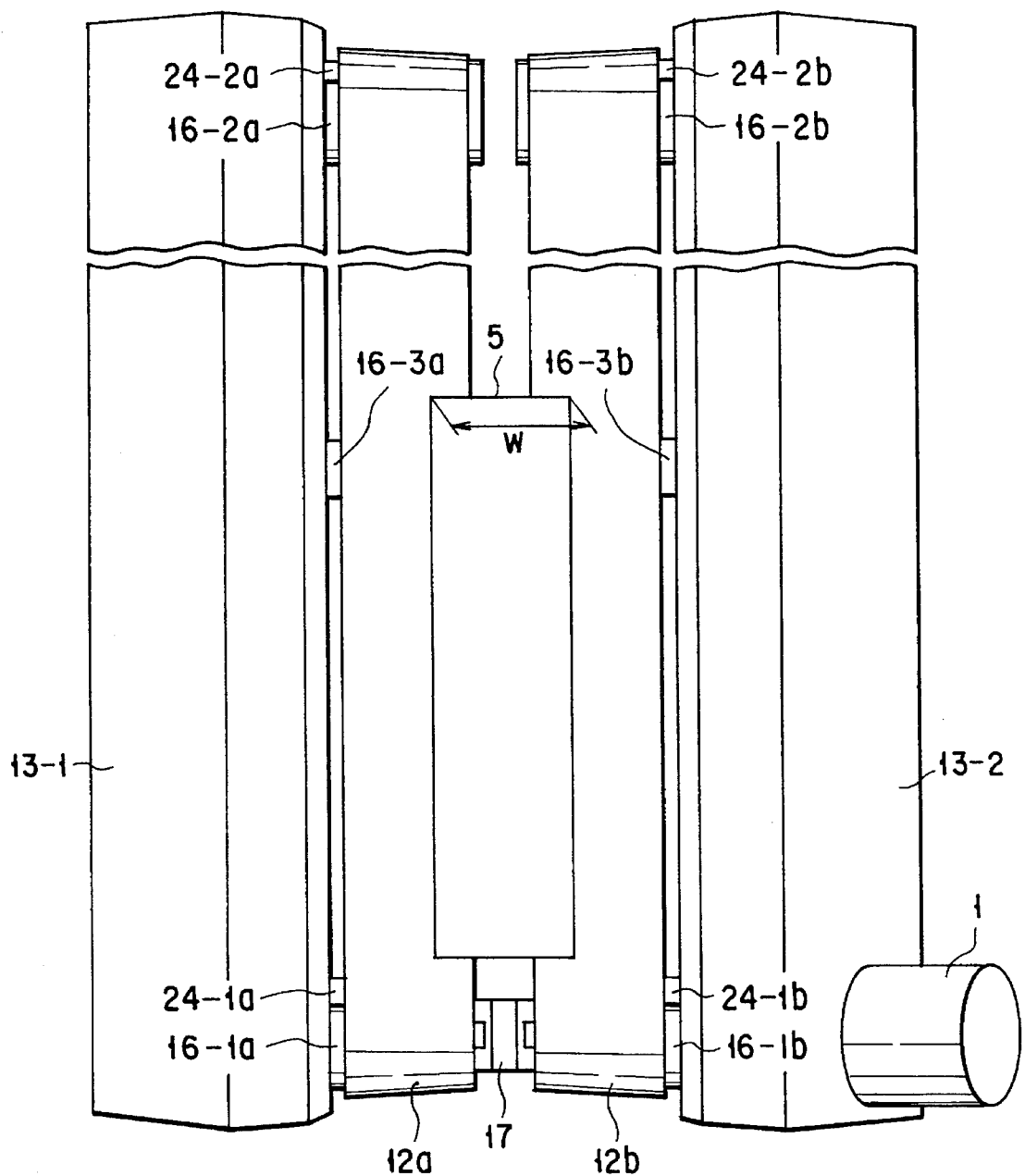
F I G. 11

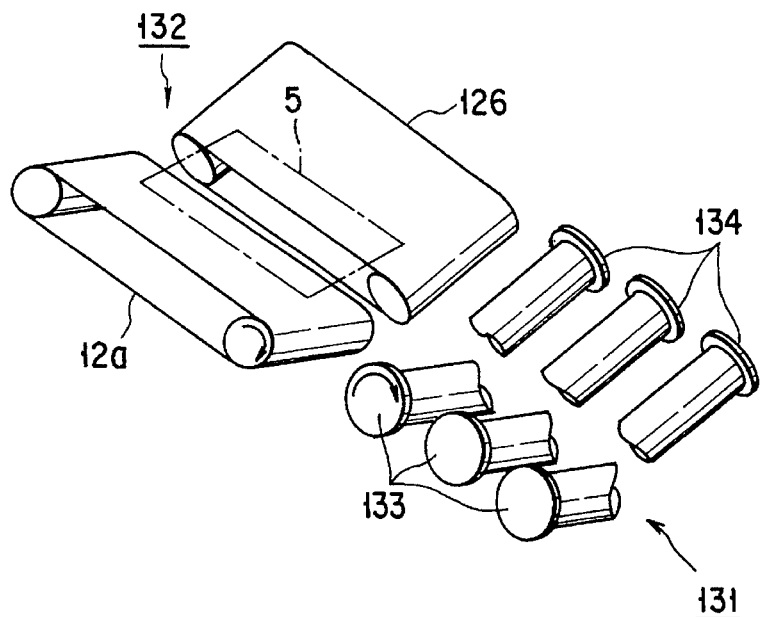
F I G. 13
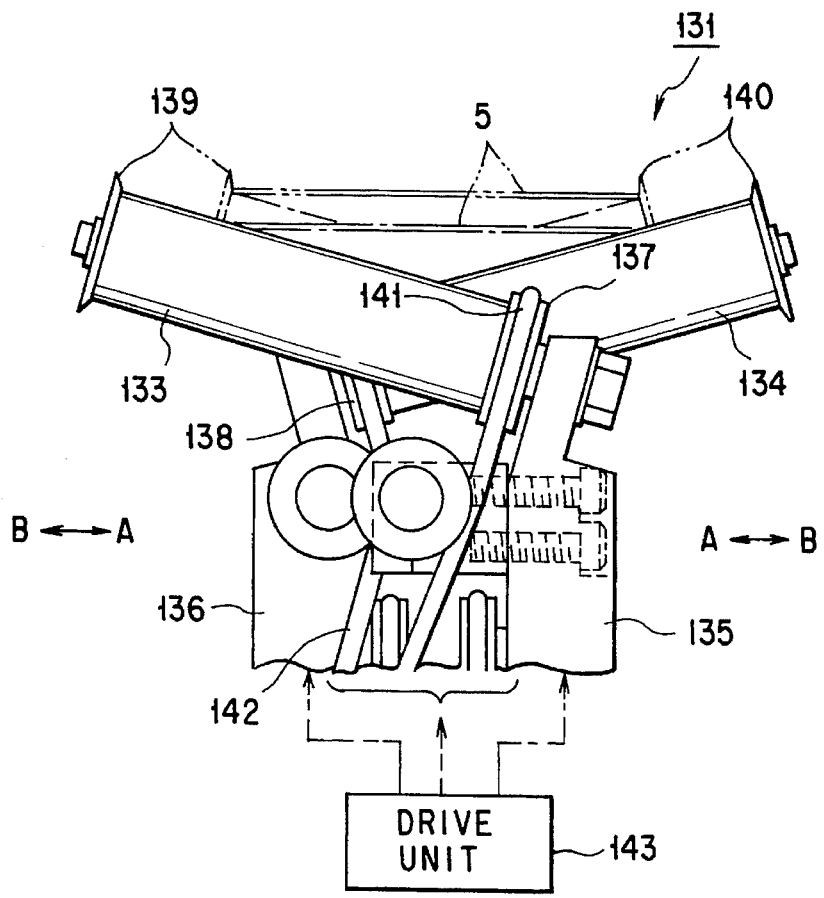
F I G. 14

APPARATUS FOR CONVEYING A LEAD FRAME

BACKGROUND OF THE INVENTION

1. Field of the Invention

The prevent invention relates to a lead frame conveying apparatus for use in the manufacture of, for example, a semiconductor device.

2. Description of the Related Art

FIGS. 15 and 16 show a conventional lead frame conveying apparatus. In FIGS. 15 and 16, a shaft 2 is rotatably mounted on one-end sides of guides 6-1 and 6-2 and driven by a motor 1 mounted on the guide 6-1. Rollers 3-1 and 3-2 are provided on the shaft 2 such that they are spaced apart at a predetermined interval. A shaft is mounted on the other-end side, not shown, of guides 6-1 and 6-2. Two rollers, not shown, are provided on the shaft, one roller being paired with the roller 3-1 and the other roller being paired with the roller 3-2. A belt 4-1 is wrapped between the roller 3-1 and the corresponding paired roller and a belt 4-2 is wrapped between the roller 3-2 and the corresponding paired roller. The belts 4-1 and 4-2 are rotated by being driven by the motor 1. A lead frame 5 is placed on the belts 4-1 and 4-2 and conveyed with the rotation of these belts 4-1 and 4-2.

In the arrangement thus explained, the lead frame 5 is contacted with the belts 4-1 and 4-2 only at those areas near its opposite sides extending in a direction of conveyance of the lead frame with a middle portion of the lead frame 5 not contacted with the belts 4-1 and 4-2. This is because a bed, on which an IC chip, etc., is placed, as well as inner leads for supplying an electric power and signal to the IC chip, are placed at the middle portion of the lead frame 5, that is, because, being contacted with the belt, the bed and inner leads cannot maintain their clean level.

The guides 6-1 and 6-2 prevent the lead frame 5 from being dropped during conveyance of the lead frame. The guides 6-1 and 6-2 have nuts 7 with their threaded directions reversed with respect to each other. The nuts 7 are threadedly mounted on a screw shaft 8. The screw shaft 8 has threaded portions whose directions are reversed with the middle of the shaft 8 as a boundary. The screw shaft 8 is driven by a motor 9. With the rotation of the screw shaft 8, the guides 6-1 and 6-2 are moved in the mutually opposite directions. The distance between the guides 6-1 and 6-2 can be adjusted by varying the rotation direction of the screw shaft 8. For this reason, various kinds of lead frames of different sizes are conveyed on a single conveying apparatus.

It is, therefore, necessary to adjust the distance between the guides 6-1 and 6-2 each time a different kind of lead frame is conveyed on a conventional apparatus. It takes up a lot of time and effort.

Further, more component parts, including the nuts 7, screw shaft 8 and motor 9, are necessary to move the guides 6-1 and 6-2. Thus the apparatus becomes complex in construction and expensive. More component parts require more labor in the repair and checkup of the apparatus and are liable to fail, thus posing a reliability problem.

SUMMARY OF THE INVENTION

It is accordingly the object of the present invention to provide a lead frame conveying apparatus which can convey various kinds of lead frames without lowering the clean level of the lead frame and can achieve high reliability without incurring any added cost.

The object of the present invention is achieved by the following construction.

An apparatus for conveying a lead frame is provided, comprising:

first and second shafts so arranged that these shafts are spaced a predetermined interval apart from each other;

drive means for driving the first shaft;

belt means, wrapped on the first and second shafts, for conveying the lead frame, the surface of the belt means defining a recess inclined from opposite-side edges along a conveying direction of the belt means toward a middle, the recess being provided along the conveying direction of the belt means and the lead frame having its opposite-side edges contacted with the surface of the belt means.

Further, the object of the present invention is achieved by the following construction.

An apparatus for conveying a lead frame is provided which comprises:

a first guide for rotatably holding first end sides of first and second shafts, the first and second shafts being arranged in a spaced-apart relation as viewed in a conveying direction of the lead frame;

a second guide for rotatably holding first end sides of third and fourth shafts, the third and fourth shafts being spaced apart in the conveying direction of the lead frame and the first and second guides being so inclined that second end sides of the first, second, third and fourth shafts are lower than the first end sides of the first, second, third and fourth shafts;

a first belt wrapped between the first shaft and the second shaft;

a second belt wrapped between the third shaft and the fourth shaft, the lead frame being conveyed such that only its opposite-side edges along the conveying direction of the lead frame are contacted with the surface of second and first belts; and drive means for driving the first and third shafts.

According to the above-mentioned conveying apparatus, the lead frame is so conveyed that only its opposite-side edges are contacted with the inclined surface of the belt or the surfaces of inclined belts and that the middle portion of the lead frame is not contacted with the surface of the belt or these belts. Since, for example, a chip-mounting bed and terminal leads provided at the middle portion of the lead frame are not contacted with the belt surface, it is possible to maintain the clean level of these component parts. The use of such a belt structure enables lead frames of different sizes to be conveyed under a clean condition. Further it is possible to reduce the number of component parts involved and hence reduce a manufacturing cost.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 11 is a plan view showing a conveying apparatus according to a fifth embodiment of the present invention;

FIG. 13 is a perspective view schematically showing a gauging apparatus for a lead frame applied to the present invention;

FIG. 14 is a side view showing a major part of the gauging apparatus in FIG. 13;

DETAILED DESCRIPTION OF THE PREFERRED EMBODIMENTS

The embodiments of the present invention will be explained below with reference to the accompanying drawings.

Figure 1:
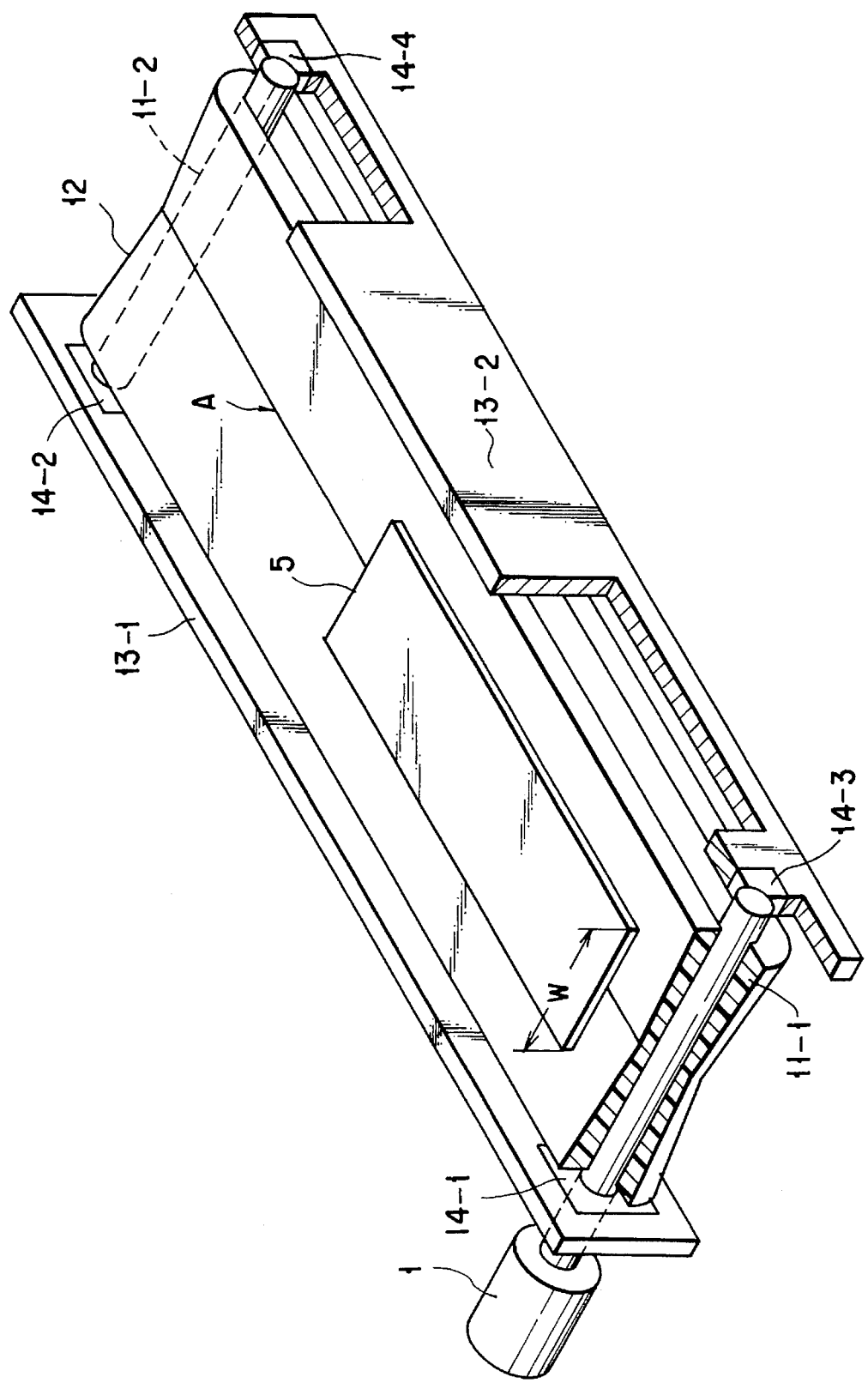
FIG. 1 is a perspective view, partly taken away, showing a conveying apparatus according to a first embodiment of the present invention.

FIG. 1 shows a lead frame conveying apparatus according to a first embodiment of the present invention.

Figure 2:
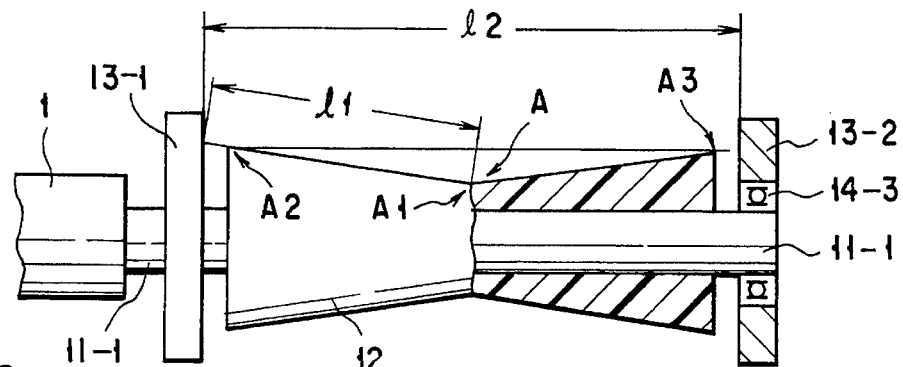
FIG. 2 is a side view, partly taken away, showing a major part of the apparatus shown in FIG. 1.

In FIGS. 1 and 2, guides 13-1 and 13-2 are so arranged that they are spaced a predetermined distance apart from each other. Bearings 14-1 and 14-2 are provided on the guide 13-1 and bearings 14-3 and 14-4 are provided on the guide 13-2. A shaft 11-1 is mounted in bearings 14-1 and 14-3 and a shaft 11-2 is mounted in bearings 14-2 and 14-4. A motor 1 for belt drive is connected to the shaft 1-1. An endless belt 12 is wrapped on the shafts 11-1 and 11-2. When the motor 1 is driven, the shaft 11-1 is rotated, causing the belt 12 to be rotated. A recess A is provided at a middle of the belt 12 as viewed along a rotation direction of the belt 12. That is, as shown in FIG. 2, the surface of the belt 12 is linearly so inclined that its middle A1 is lowered relative to its opposite-side edges A2 and A3 in the vicinity of the guides 13-1 and 13-2. The guides 13-1 and 13-2 prevent a lead frame from being dropped from the belt 12 during conveyance.

The belt 12 is sliplessly wrapped on the shafts 11-1 and 11-2 and, when the shaft 11-1 is rotated by the motor 1, the belt 12 is rotated. A lead frame 5 of a width w is conveyed on the belt 12 with the rotation of the belt 12. Since the belt 12 has the recess A, the lead frame 5 is so conveyed that its opposite-side edge portions as viewed along the conveying direction are contacted with the belt 12 with the middle portion of the lead frame 5 not contacted with the belt 12.

Since bed and inner leads, not shown, are provided at the middle portion of the lead frame 5 and not contacted with the belt 12, the clean level of these is not lowered.

The width W of the lead frame conveyable on the conveying apparatus thus arranged is in a range above a distance l1 extending from a middle A1 of the recess A past the side edge A2 of the belt 12 to the guide 13-1 but below a distance l2 from the guide 13-1 to the guide 13-2. The lead frame of such a dimension, even being displaced during conveyance, has its middle portion not contacted with the belt 12.

Figure 3:
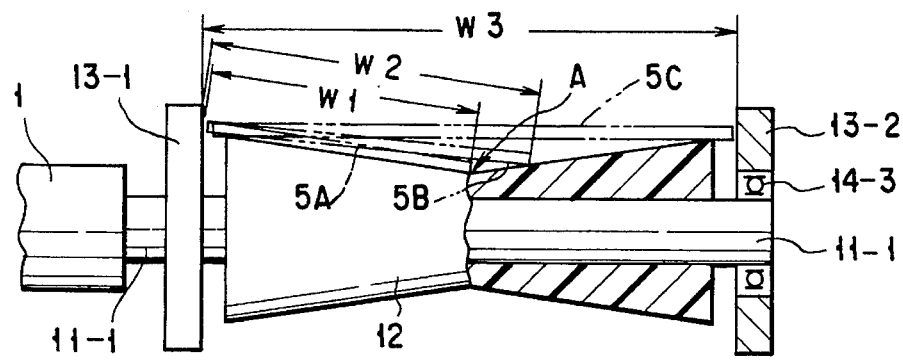
FIG. 3 is a side view, partly taken away, showing a relation of a lead frame to the apparatus in FIG. 2.

That is, if, as shown in FIGS. 2 and 3, a lead frame 5A has a width equal to the distance l1 or less than a width W1, when the lead frame is displaced during conveyance, then the lead frame 5A will have its middle portion sometimes contacted with the belt. Even if being displaced during conveyance, a lead frame 5B of a width W2 exceeding the distance l1 will have its middle portion not contacted with the belt 12. Further, a lead frame 5C, having a width W3 somewhat smaller than the guide-to-guide distance l2, will have its middle portion not contacted with the belt 12.

According to this embodiment, a lead frame of a width W greater than the distance l1 but less than the distance l2 can be conveyed without the need to adjust the guide-to-guide distance as in the conventional apparatus.

Figure 4:
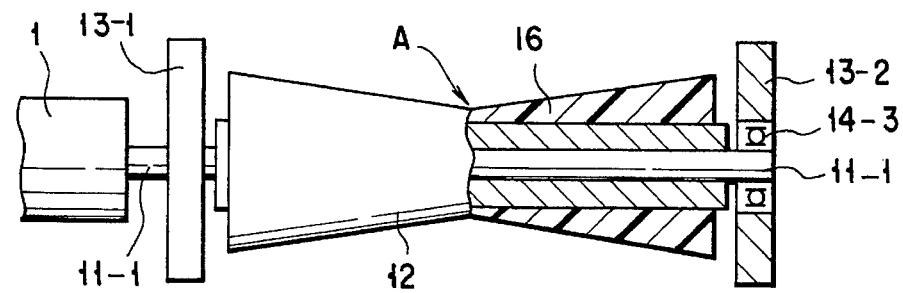
FIG. 4 is a side view, partly taken away, showing a modification of the first embodiment.

FIG. 4 shows a modification of the first embodiment.

Although, in the embodiment shown in FIGS. 1 to 3, the belt 12 is wrapped directly on the shafts 11-1 and 11-2, it may be wrapped on rollers 16, as shown in FIG. 4, each mounted on shafts 11-1 and 11-2.

Figure 5:
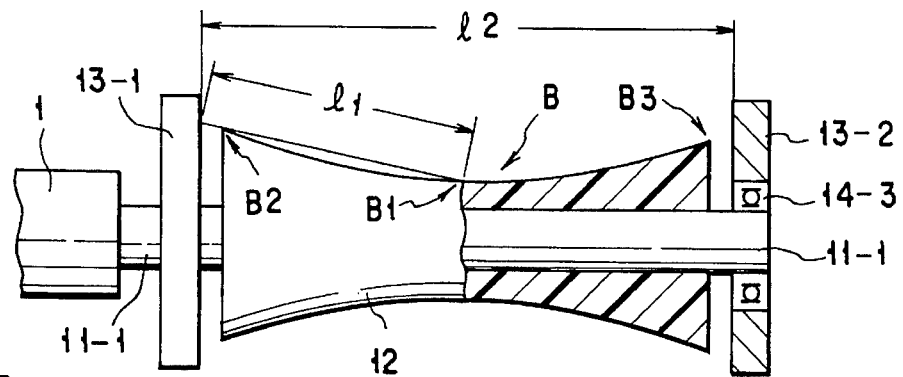
FIG. 5 is a side view, partly taken away, showing a major part of a conveying apparatus according to a second embodiment of the present invention.

FIG. 5 show a second embodiment of the present invention.

In FIG. 5, a recess B is provided in a belt 12. The recess B is so formed as to have an arcuate surface portion connecting a middle B1 to a side edge B2 of the belt 12 and an arcuate surface portion connecting the middle B1 to the side edge B3 of the belt 12. Thus the belt 12 has a curved surface.

Figure 6:
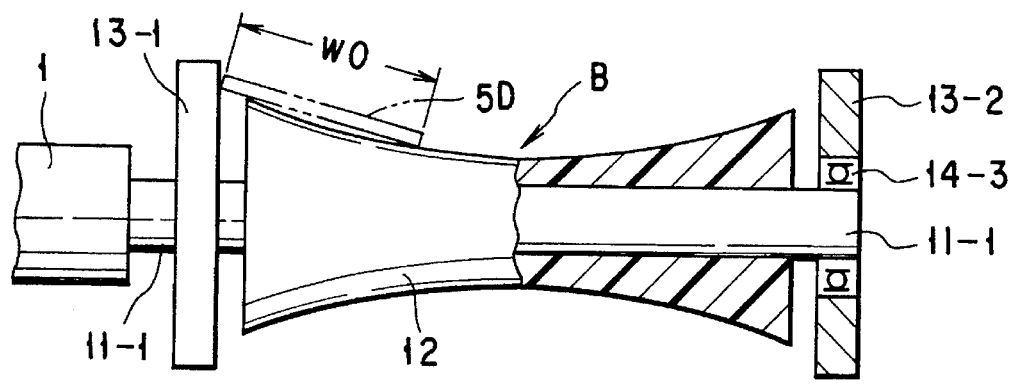
FIG. 6 is a view showing a relation of a lead frame to the apparatus in FIG. 5.

According to this embodiment, the lead frame has a width smaller than a distance l1 connecting the middle B1 of the belt 12 to the guide 13-1 past the side edge of the belt 12 and hence the lead frame can be conveyed such that its middle portion is not contacted with the belt 12. Provided that a lead frame 5D has a width W0 smaller than a distance l1 as shown in FIG. 6, the lead frame 5D will have its middle portion not contacted with the belt 12 due to the curved surface of the belt 12 even if the belt 12 is displaced from its middle toward, for example, the guide 13-1. According to this embodiment, it is possible to convey more kinds of lead frames than according to the first embodiment.

Even in the second embodiment, a roller can be mounted on shafts 11-1 and 11-2 (not shown) as shown in FIG. 4.

Figure 7:
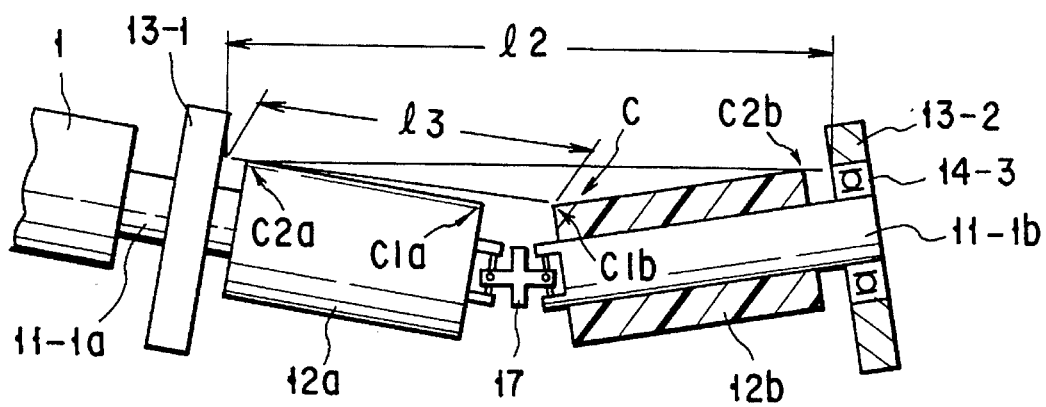
FIG. 7 is a side view, partly taken away, showing a major part of a conveying apparatus according to a third embodiment of the present invention.

FIG. 7 shows a third embodiment of the present invention. In FIG. 7, a shaft 11-1 is divided by its middle into first and second subshafts 11-1a and 11-1b. First end sides of the first and second subshafts 11-1a and 11-1b are connected together by a universal joint 17. A shaft 11-2, not shown, has first and second subshafts 11-2a and 11-2b as in the case of the shaft 11-1. The second end sides of the first and second subshafts 11-1a and 11-1b and those of the first and second subshafts 11-2a and 11-2b are so held as to be rotatable on the guides 13-1 and 13-2, respectively. The guides 13-1 and 13-2 are so mounted at their upper areas that these are inclined toward each other. Thus, the shafts 11-1 and 11-2 are arranged in a substantially V-shaped configuration with the joint 17 as a middle and the first end sides of the first and second subshafts 11-1a and 11-1b and first and second subshafts 11-2a and 11-2b are so inclined as to be made lower than the second end sides of these subshafts 11-1a and 11-1b and these subshafts 11-2a and 11-2b. A first endless belt 12a is wrapped on the first subshaft 11-1a of the first shaft 11-1 and first subshaft 11-2a of the second shaft 11-2 and a second endless belt 12b is wrapped on the second subshaft 11-1b of the first shaft 11-1 and second subshaft 11-2b of the second shaft 11-2, not shown. Thus the first and second belts 12a and 12b are so arranged as to be inclined toward each other and have a recess C along the direction in which the first and second belts 12a and 12b are rotated. That is, first side edges C1a and C1b of the first and second belts 12a and 12b are made lower than the second side edges C2a and C2b of the first and second belts 12a and 12b. A motor 1 is connected to the subshaft 11-1a and, when the motor 1 is driven, the first and second belts 12a and 12b are rotated in an inclined state.

The minimal width of the lead frame conveyable by the conveying apparatus corresponds to a distance l3 extending, for example, from first side edge C1b of the second belt 12b past the second side edge C2a of the first belt 12a to the guide 13-1. The maximal width with which the lead frame can be conveyed corresponds to a distance l2 from the guide 13-1 to the guide 13-2. The lead frame, having a width greater than the distance l3 but less than the distance l2, can be conveyed such that its middle portion is not contacted with the first and second belts 12a and 12b.

Figure 8:
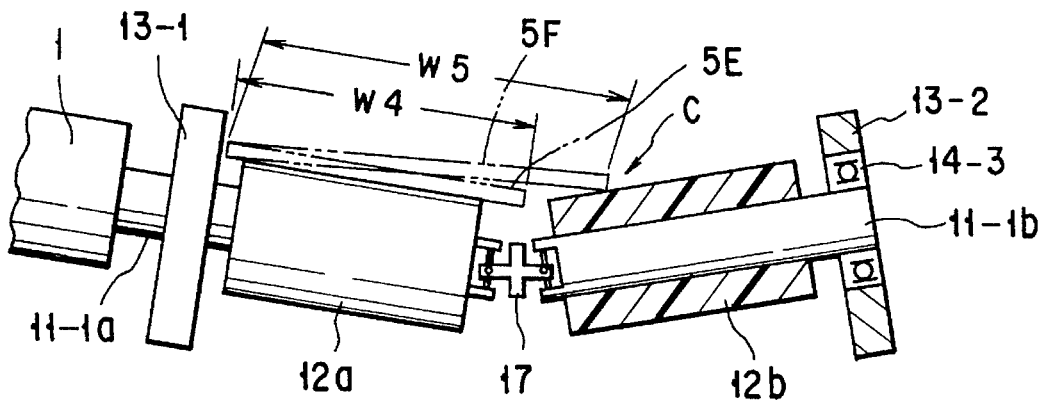
FIG. 8 is a side view showing a relation of a lead frame to the apparatus shown in FIG. 7.

FIG. 8 shows a relation of the lead frame to the conveying apparatus of the third embodiment. In FIG. 8, if a lead frame 5E whose width W4 is equal to, or less than, the distance l3 is to be conveyed, there is a possibility that the middle portion of the lead frame 5E will be contacted with the first belt 12a when the lead frame 5E is displaced during conveyance. However, a lead frame 5F having a width W5 greater than the width W4 will have its middle portion not contacted with the first belt 12a even if being displaced during conveyance.

According to the third embodiment, even if any particular recess is not provided in the belt in the first and second embodiments, it is possible to provide a recess C along the rotation direction of the first and second belts 12a and 12b. For this reason, existing flat-surfaced belts can be employed and the resultant conveying apparatus can be manufactured at low costs.

Figure 9:
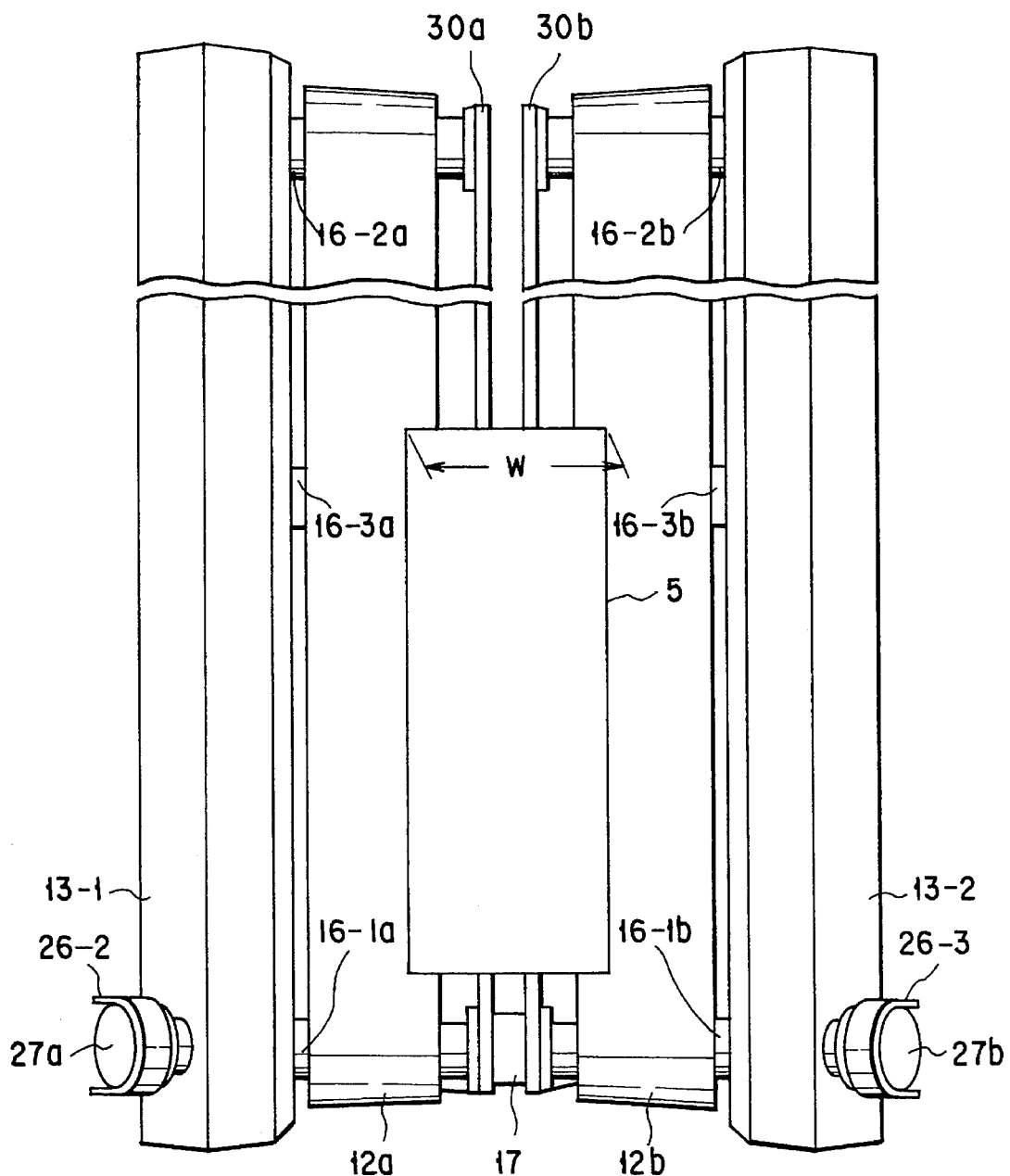
FIG. 9 is a plan view showing a conveying apparatus according to a fourth embodiment of the present invention.
Figure 10:
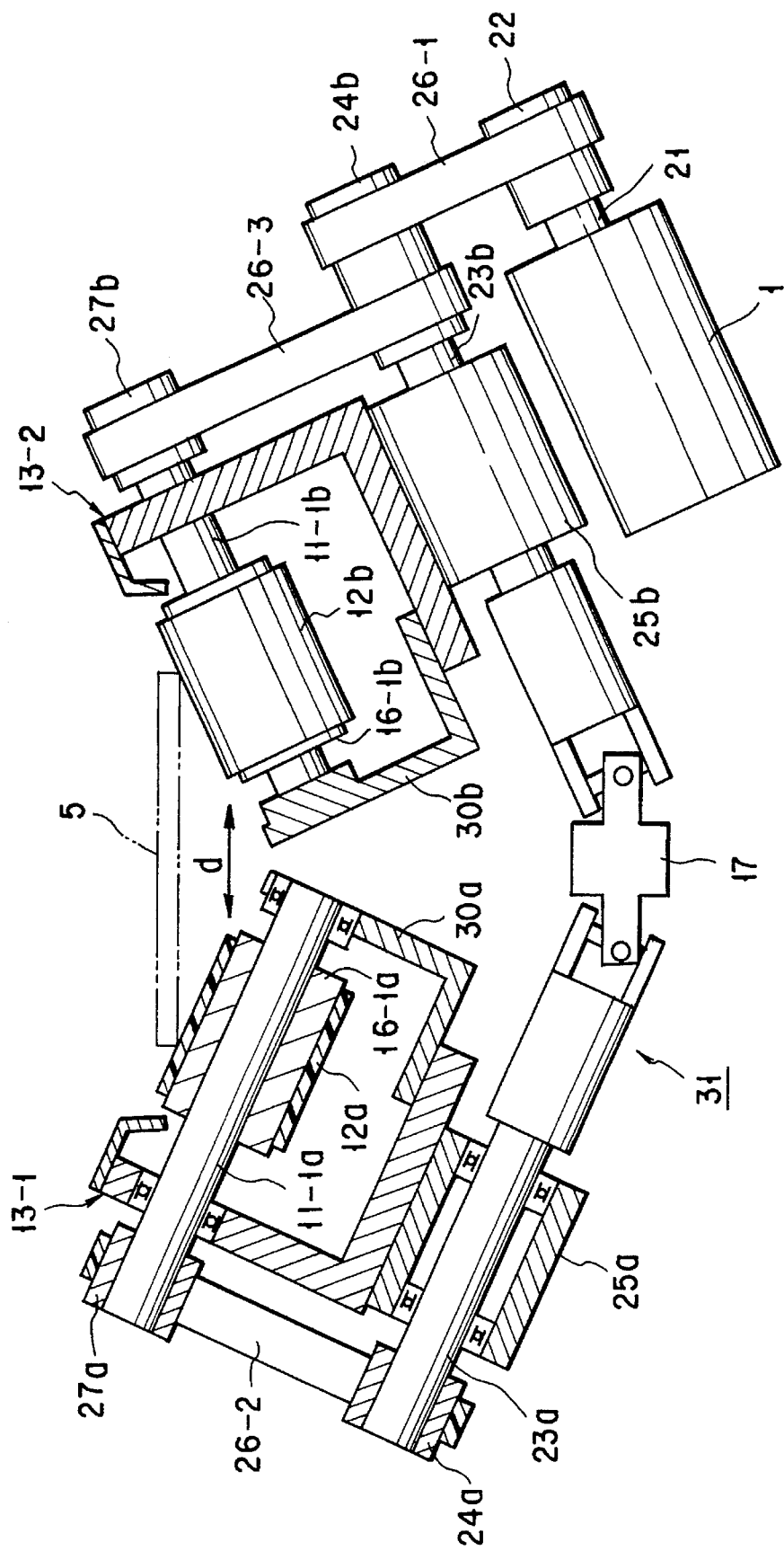
FIG. 10 is a side view, partly taken away, showing a major part of the apparatus in FIG. 9.

FIGS. 9 and 10 show a fourth embodiment of the present invention. The fourth embodiment shown in FIGS. 9 and 10 is different from the third embodiment shown in FIGS. 7 and 8 in the following points. First and second subshafts 11-1a and 11-1b are not connected together and are connected to a motor 1 with the use of a transmission 31 for transmitting a power.

In FIGS. 9 and 10, the first subshaft 11-1a of the first shaft 11 is rotatably held at its one end portion on a guide 13-1 and at its other end portion on a holding member 30a. The second subshaft 11-1b is rotatably held at its one end portion on a guide 13-2 and at its other end portion on a holding member 30b. The first and second subshafts 11-1a and 11-1b are inclined toward to each other as in the case of the third embodiment and first and second rollers 16-1a and 16-1b are mounted on first and second subshafts 11-1a and 11-1b, respectively. First and second subshafts 12-1a and 12-1b of a second shaft 12, not shown, have the same construction as the first and second subshafts 11-1a and 11-1b of the first shaft 11. Rollers 16-2a and 16-2b are mounted on the first and second subshafts 12-1a and 12-1b, respectively, as shown in FIG. 9. A first belt 12a is wrapped on the rollers 16-1a and 16-2a and a second belt 12b is wrapped on rollers 16-1a and 16-2b. The first and second belts 12a and 12b have a flat surface.

In FIG. 9, a roller 16-3a is mounted between the rollers 16-1a and 16-2a and a roller 16-3b between the rollers 16-1b and 16-2b, in the case of the first and second belts 12a and 12b being long, so as to prevent any slack from being produced on these belts.

As shown in FIG. 10, a gap of a width d is provided between a first side edge of the first belt 12a extending along the direction of conveyance of the first belt 12a and a first side edge of the second belt 12b extending along the direction of conveyance of the second belt 12b. A lead frame 5 is conveyed by the first and second belts 12a and 12b such that its side edges extending along the direction of conveyance of these belts are contacted with the first and second belts 12a and 12b.

As shown in FIG. 10, bearing 25a and 25b are mounted on the guides 13-1 and 13-2, respectively. The bearing 25a is mounted on an intermediate portion of a shaft 23a constituting one part of the transmission 31 and the bearing 25b is mounted on an intermediate portion of a shaft 23b. One end of the shaft 23a is connected by a universal joint 17 to one end of the shaft 23b.

A roller 24a is mounted on the other end of the shaft 23a and a roller 27a is mounted on the end of the first subshaft 11-1a. A belt 26-2 is wrapped between the roller 24a and the roller 27a. A roller 24b is mounted on the other end of the shaft 23b and a roller 22 are mounted on a shaft 21 of a motor 1. A belt 26-1 is wrapped between the roller 22 and the roller 24b. Further, a roller 27b is mounted on the end of the second subshaft 11-1b and a belt 26-3 is wrapped between the roller 27b and the roller 24b.

In the construction thus explained, the driving of the motor 1 causes the roller 22 to be rotated and hence the roller 24b to be rotated through the belt 26-1. This causes the rotation of the shaft 23b, universal joint 17, shaft 23a and roller 24a. The rollers 27a and 27b are rotated through belts 26-2 and 26-3 and hence the first and second subshafts 11-1a and 11-1b are rotated. With the rotation of the first and second subshafts 11-1a and 11-1b, the first and second belts 12a and 12b are simultaneously rotated in the same direction, thus enabling conveyance of the lead frame 5 which is placed on the belts 12a and 12b.

In the fourth embodiment, the joint 17 which connects the first and second subshafts 11-1a and 11-1b, shown in FIGS. 7 and 8, can be omitted. Therefore, it is possible to narrow the gap between the first belt 12a and the second belt 12b and hence to convey a narrow-width lead frame so that more kinds of lead frames can be conveyed on a resultant conveying apparatus.

Figure 12:
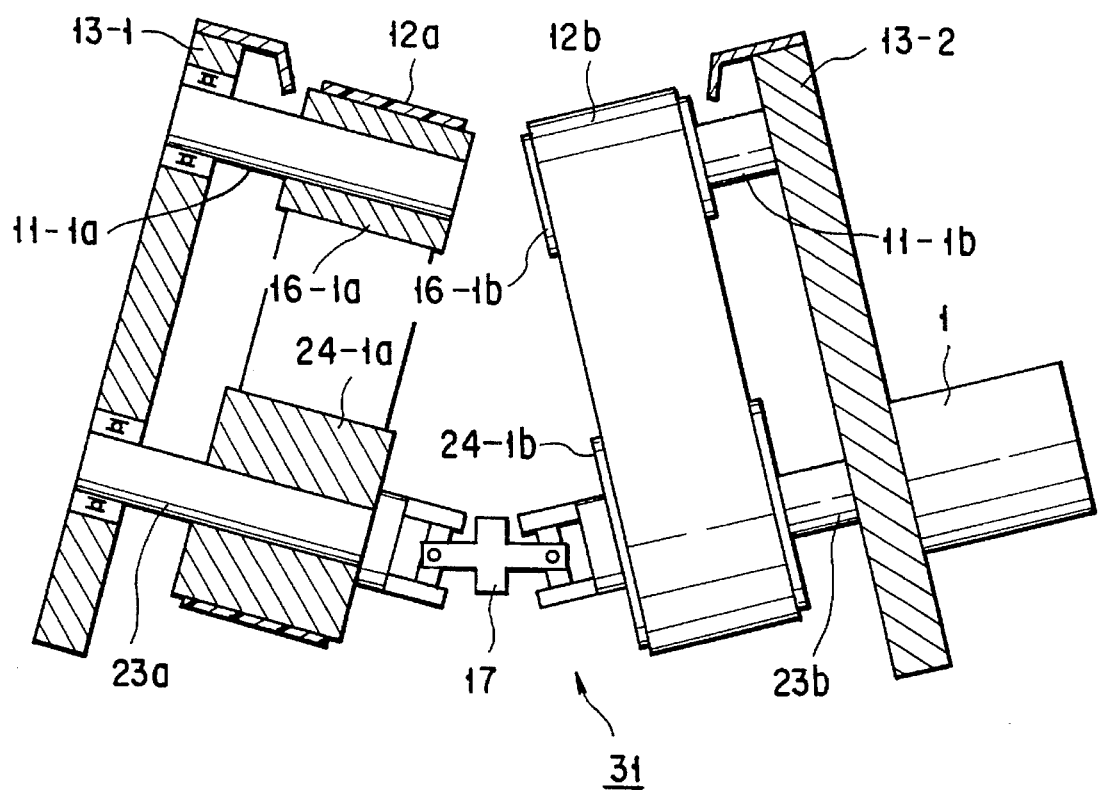
FIG. 12 is a side view, partly taken away, showing a major part of the apparatus in FIG. 11.
Figure 15:
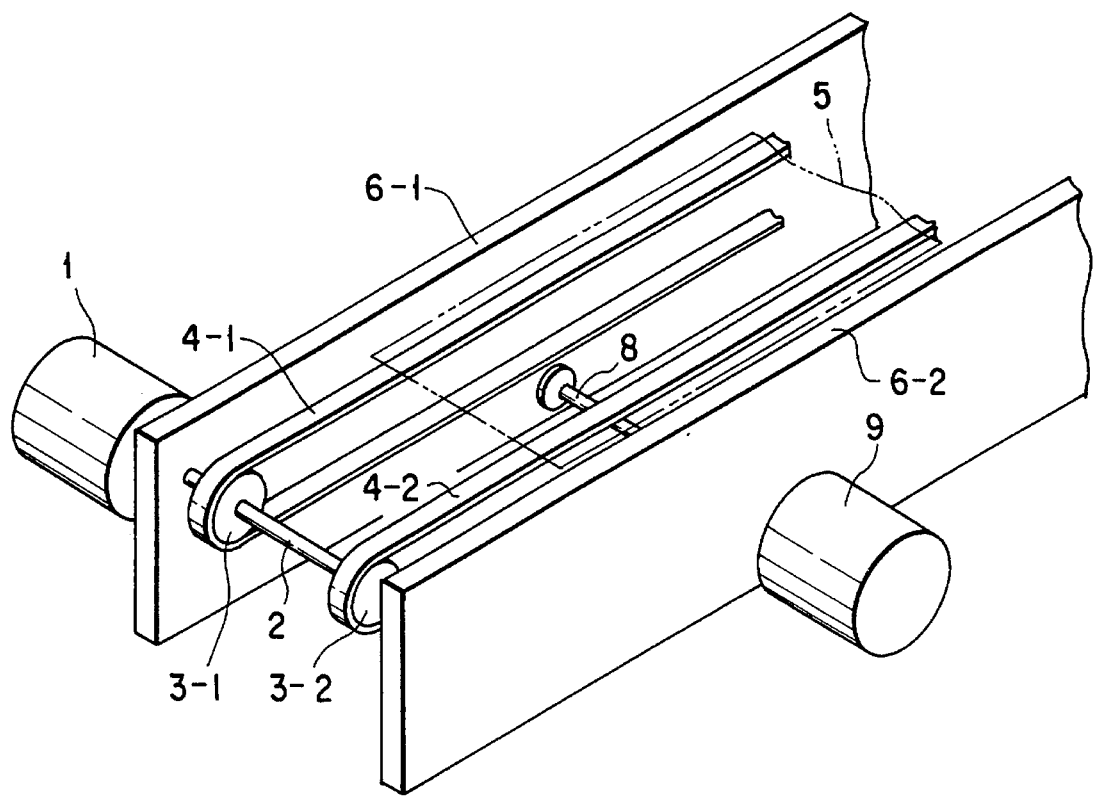
FIG. 15 is a perspective view showing a conventional conveying apparatus.
Figure 16:
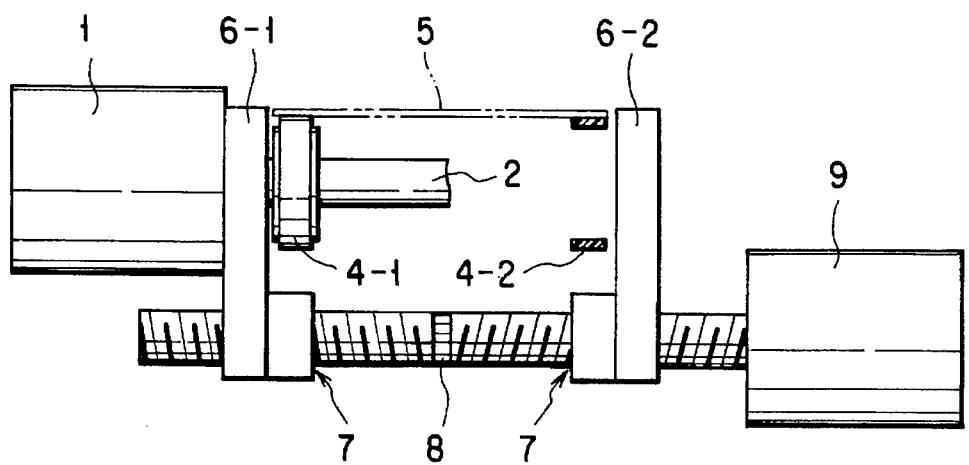
FIG. 16 is a side view showing the conventional apparatus.

FIGS. 11 and 12 show a fifth embodiment of the present invention. Compared with the fourth embodiment, the fifth embodiment provides a transmission 31 of simpler structure. In FIGS. 11 and 12, the same reference numerals are employed to designate parts or elements corresponding to those shown in FIGS. 9 and 10.

In FIGS. 11 and 12, guides 13-1 and 13-2 are arranged in an inclined way. First and second subshafts 11-1a and 11-1b are attached to the guides 13-1 and 13-2 with their bearings therebetween. Rollers 16-1a and 16-1b are mounted on the first and second subshafts 11-1a and 11-1b. Rollers 16-2a and 16-2b are mounted on first and second subshafts, not shown, in the case of the rollers 16-1a and 16-1b.

As shown in FIG. 12, a motor 1 is mounted at the guide 13-2 below the second subshaft 11-1b. A shaft 23b of the motor 1 extends through the guide 13-2. The shaft 23b is held in the guide 13-2 with the use of a bearing, not shown. A shaft 23a is held in the guide 13-1 with the use of a bearing, not shown, below the first subshaft 11-1a. The shaft 23a is coupled by a universal join 17 to the shaft 23b. A roller 24-1a is mounted on an intermediate portion of the shaft 23a and a roller 24-1b on an intermediate portion of the shaft 23b.

As shown in FIG. 11, rollers 24-2a and 24-2b are arranged at the guides 13-1 and 13-2 below the rollers 16-2a and 16-2b. The rollers 24-2a and 24-2b are mounted on the guides 13-1 and 13-2 in the same arrangement as the rollers 16-2a and 16-2b. A first belt 12a is run on the rollers 16-1a, 16-2a, 24-2a and 24-1a and a second belt 12b on the rollers 16-1b, 16-2b, 24-2b and 24-1b. The first and second belts 12a and 12b are inclined toward each other and a lead frame is conveyed along the direction of conveyance with their opposite-side edges placed on the surface of the belts 12a and 12b.

In the above structure, the driving of the motor 1 causes the shaft 23a and 23b to be rotated and the first and second belts 12a and 12b to be simultaneously rotated in the same direction. Thus the lead frame can be conveyed on the belts 12a and 12b in the same way as in the fourth embodiment. Further, the fifth embodiment is simpler in arrangement than the fourth embodiment, thus enabling a resultant conveying apparatus to be manufactured at low costs. It is, therefore, possible to achieve less component parts and less faults which may be involved and hence to achieve high reliability.

FIGS. 13 and 14 shown an embodiment for a gauging apparatus for allowing a lead frame which is conveyed by the conveying apparatus to be positioned in accordance with the steps of manufacturing a semiconductor device.

The respective conveying apparatuses of the first to fifth embodiments allow the lead frame to be conveyed on the belt even if the lead frame is displaced somewhat from the middle of the recess of the belt or the middle of the belt-to-belt recess and prevent the middle portion of the lead frame from being contacted with the belt even if the lead frame is displayed somewhat from the middle of the recess of the belt. In the case where the lead frame is conveyed off the middle of the belt, it is necessary to position the lead frame by the gauging apparatus in accordance with the respective steps of manufacturing a semiconductor device.

In FIG. 13, a gauging apparatus 131 is arranged downstream of a conveying apparatus 132. The conveying apparatus 132 comprises first and second belts 12a and 12b as in the case of the third embodiment shown in FIG. 7. The gauging apparatus 131 comprises a plurality of first rollers 133 arranged at the same inclination angle as that of the first belt 12a and a plurality of second rollers 134 arranged in the same inclination angle as that of the second belt 12b.

FIG. 14 shows the first and second rollers 133 and 134. The first roller 133 is rotatably held, as its one end, on the first holding body 135 and the second roller 134 is rotatably held, at its one end, on a second holding body 136. Pulleys 137 and 138 are provided at first end sides of first and second rollers 133 and 134, respectively, and flanges 139 and 140 are provided at the second end sides of the first and second rollers 133 and 134, respectively. A belt 141 is wrapped on the pulley 137 and a belt 142 on the pulley 142. These belts 141 and 142 are driven by a motor, not shown, mounted on a drive unit 143 and the first and second rollers 133 and 134 are rotated in the same direction as that in which the first and second belts 12a and 12b are rotated. The first and second holding bodies 135 and 136 are connected to the drive unit 143. The drive unit 143 drives the first and second holding bodies 135 and 136 in a direction toward each other as indicated by an arrow A in FIG. 14 and the first and second holding bodies 135 and 136 in a direction away from each other as indicated by an arrow B in FIG. 14. The belts 141 and 142 can be driven by a device other than the drive unit 143.

In the above-mentioned arrangement, the lead frame 5 is conveyed by the first and second belts 12a and 12b to the gauging apparatus 131. In the gauging apparatus 131, the first and second rollers 133 and 134 are rotated in a spaced-apart relation as shown in FIGS. 13 and 14. The lead frame 5 is fed to a predetermined place where the drive unit 143 drives the first and second holding bodies 135 and 136 in the direction toward each other as indicated by the arrow A in FIG. 14. For this reason, the lead frame 5 slides on the surface of the first and second rollers 133 and 134, thus moving the lead frame 5 toward the middle of the first and second rollers 133 and 134 with this movement, the lead frame 5 moves up along the inclined surfaces of the first and second rollers 133 and 134. The drive unit 143 drives the first and second holding bodies 133 and 134 toward each other until the opposite-side edges of the lead frame 5 as viewed along the direction of conveyance are brought into contact with the flanges 139 and 140 of the first and second rollers 133 and 134. The lead frame, being gauged, is fed to the next processing location by the rotating first and second rollers 133 and 134 when the lead frame 5 is fed to the next processing location, the drive unit 143 drives the first and second holding bodies 135 and 136 toward each other as indicated by an arrow B in FIG. 14.

When the first and second holding bodies 135 and 136 are driven by the drive unit 143, the first and second rollers 133 and 134 may, or may not, be rotated or stopped. That is, the lead frame is gauged, while either being fed or stopped.

While using the above-mentioned gauging apparatus, the conveying apparatus according to the first to fifth embodiments of the present invention can be put to effective use.

What is claimed is:

1. An apparatus for conveying a lead frame, comprising:
   first, second, third and fourth shafts each having a first end and a second end;
   a first guide for rotatably holding the first ends of the first and second shafts, the first and second shafts being spaced from each other in a conveying direction of the lead frame;
   a second guide for rotatably holding the first ends of the third and fourth shafts, the third and fourth shafts being spaced from each other in the conveying direction of the lead frame, the first and second guides being inclined so that the second ends of the first, second, third and fourth shafts are lower than the first ends of the first, second, third and fourth shafts;
   a first endless belt trained about the first shaft and the second shaft;
   a second endless belt trained about the third shaft and the fourth shaft, the lead frame being conveyed such that only opposite sides contact with the second and first belts along the conveying direction of the lead frame;
   drive means for driving the first and third shafts; and
   a joint coupling the first shaft to the third shaft.

2. An apparatus according to claim 1, in which the drive means comprises a motor for rotating the third shaft and transmitting means for transmitting a drive force of the motor to the first shaft.

3. An apparatus according to claim 1, further comprising:

first and second holding bodies;

a plurality of first rollers each having a first end and a second end, the first ends of the first rollers being held on the first holding body and the second ends of the first rollers having a flange, the first rollers being held on the first holding body at a first angle so that the first rollers and the first belt have the same inclination;

a plurality of second rollers each having a first end and second end, the first ends of the second rollers being rotatably held on the second holding body and the second ends of the second rollers having a flange, the second rollers being held on the second holding body at a second angle so that the second rollers and the second belt have the same inclination, wherein the second rollers together with the first rollers receive the lead frame being conveyed by the first and second belts;

first drive means for rotating the first and second rollers; and second drive means for moving the first and second holding bodies in mutually opposite directions perpendicular to the conveying direction, so that when the first and second rollers receive the lead frame from the first and second belts, the second drive means moves the first and second holding bodies until opposite side edges of the lead frame contact with the flanges of the first and second rollers along the conveying direction of the lead frame.

4. An apparatus for conveying a lead frame, comprising:

a first shaft having first and second subshafts, the first and second subshafts of the first shaft each having a first end and a second end;

a joint coupling the first ends of the first and second subshafts of the first shaft;

a second shaft having first and second subshafts, the first and second subshafts of the second shaft each having a first end and second end;

a first guide for rotatably holding the second ends of the respective first subshafts of the first and second shafts;

a second guide for rotatably holding the second ends of the respective second subshafts of the first and second shafts, the first and second guides being inclined toward each other so that the first ends of each of the first and second subshafts are lower than the second ends of each of the first and second subshafts;

drive means for driving the first shaft;

a first endless belt trained about the first subshafts of the first and second shafts; and a second endless belt trained about the second subshafts of the first and second shafts, the lead frame being conveyed so that only opposite-side edges contact with the second and first belts along the conveying direction of the lead frame.

5. An apparatus for conveying a lead frame, comprising:

first, second, third and fourth shafts each having a first end and a second end;

a first guide for rotatably holding the first ends of the first and second shafts, the first and second shafts being spaced from each other in a conveying direction of the lead frame;

a second guide for rotatably holding the first ends of the third and fourth shafts, the third and fourth shafts being spaced from each other in the conveying direction of the lead frame, the first and second guides being inclined toward each other so that the second ends of the first, second, third and fourth shafts are lower than the first ends of the first, second, third and fourth shafts;

a first endless belt trained about the first and second shafts;

a second endless belt trained about the third and fourth shafts, the lead frame being conveyed so that only opposite-side edges contact with the first and second belts along the conveying direction of the lead frame;

drive means for driving the third shaft in a rotational direction; and transmitting means for transmitting a drive power of the drive means to the first shaft to rotate the first shaft in the same direction as the rotational direction of the third shaft.

6. An apparatus for conveying a lead frame, comprising:

a first guide for rotatably holding first and second shafts, the first and second shafts being spaced from each other in a conveying direction of the lead frame;

a second guide for rotatably holding third and fourth shafts, the third and fourth shafts being spaced from each other in the conveying direction of the lead frame, the first and second guides being positioned so that upper-end sides of the first and second guides are inclined toward each other;

fifth and sixth shafts spaced from each other in the conveying direction of the lead frame;

seventh and eighth shafts spaced from each other in the conveying direction of the lead frame;

a joint coupling the fifth shaft to the seventh shaft;

drive means for driving the seventh shaft;

a first belt trained about the first, second, fifth and sixth shafts; and a second belt trained about the third, fourth, seventh and eighth shafts, the lead frame being conveyed so that only opposite-side edges contact with the second and first belts along the conveying direction of the lead frame.

7. An apparatus for conveying a lead frame, comprising:

first, second, third and fourth shafts each having a first end and a second end;

a first guide for rotatably holding the first ends of the first and second shafts, the first and second shafts being spaced from each other in a conveying direction of the lead frame;

a second guide for rotatably holding the first ends of the third and fourth shafts, the third and fourth shafts being spaced from each other in the conveying direction of the lead frame, the first and second guides being inclined so that the second ends of the first, second, third and fourth shafts are lower than the first ends of the first, second, third and fourth shafts;

a first belt trained about the first shaft and the second shaft;

a second belt trained about the third shaft and the fourth shaft, the lead frame being conveyed such that only opposite sides contact with the second and first belts along the conveying direction of the lead frame;

drive means for driving the first and third shafts;

first and second holding bodies;

a plurality of first rollers each having a first end and a second end, the first ends of the first rollers being held on the first holding body and the second ends of the first rollers having a flange, the first rollers being held on the first holding body at a first angle so that the first rollers and the first belt have the same inclination;

a plurality of second rollers each having a first end and second end, the first ends of the second rollers being rotatably held on the second holding body and the second ends of the second rollers having a flange, the second rollers being held on the second holding body at a second angle so that the second rollers and the second belt have the same inclination, wherein the second rollers together with the first rollers receive the lead frame being conveyed by the first and second belts;

first drive means for rotating the first and second rollers; and second drive means for moving the first and second holding bodies in mutually opposite directions perpendicular to the conveying direction, so that when the first and second rollers receive the lead frame from the first and second belts the second drive means moves the first and second holding bodies until opposite-side edges of the lead frame contact with the flanges of the first and second rollers along the conveying direction of the lead frame.

8. An apparatus for conveying a lead frame, comprising:

first, second, third and fourth shafts, each having a first end and a second end;

a first guide for rotatably holding the first ends of the first and second shafts, the first and second shafts being spaced from each other in a conveying direction of the lead frame;

a second guide for rotatably holding the first ends of the third and fourth shafts, the third and fourth shafts being spaced from each other in the conveying direction of the lead frame, the first and second guides being inclined toward each other so that the second ends of the first, second, third and fourth shafts are lower than the first ends of the first, second, third and fourth shafts;

a first belt trained about the first and second shafts;

a second belt trained about the third and fourth shafts, the lead frame being conveyed so that only opposite-side edges contact with the second and first belts along the conveying direction of the lead frame;

drive means for driving the third shafts in a rotational direction; and transmitting means for transmitting a drive power of the drive means to the first shaft to rotate the first shaft in the same direction as the rotational direction of the third shaft, and wherein the transmitting means further comprises:

a fifth shaft rotatably mounted on the first guide;

a sixth shaft rotatably mounted on the second guide, the sixth shaft being coupled by a joint to the fifth subshaft and driven by the drive means; and power transmitting means for transmitting a drive power of the fifth shaft to the first shaft.

* * * * *